United States Patent [19]

Fukuda et al.

[11] 4,272,397

[45] Jun. 9, 1981

[54] METHOD OF PREPARING FLAKE-LIKE CERAMIC PARTICLE OF ZINC SULFIDE PHOSPHOR

[75] Inventors: Yoji Fukuda, Neyagawa; Fumio Fukushima, Moriguchi; Tomizo Matsuoka, Neyagawa; Tsuneharu Nitta, Katano; Shigeru Hayakawa, Hirakata, all of Japan

[73] Assignee: Matsushita Electric Industrial Co., Ltd., Osaka, Japan

[21] Appl. No.: 44,102

[22] Filed: May 31, 1979

[30] Foreign Application Priority Data

Jun. 1, 1978 [JP] Japan .................................. 53-66383

[51] Int. Cl.$^3$ ....................... C09K 11/46; C04B 35/00
[52] U.S. Cl. ............................. 252/301.6 S; 106/39.5; 106/293; 423/561 B; 423/566
[58] Field of Search ................. 252/301.6 S; 423/566, 423/561 B; 106/39.5, 293

[56] References Cited

U.S. PATENT DOCUMENTS

| | | | |
|---|---|---|---|
| 2,623,858 | 12/1952 | Kroger | 252/301.6 S |
| 3,595,804 | 7/1971 | Martin | 252/301.6 S |
| 3,704,232 | 11/1972 | Frey et al. | 252/301.6 S |
| 3,872,222 | 3/1975 | Barnes | 423/561 B |

FOREIGN PATENT DOCUMENTS

642701  11/1944  United Kingdom .............. 252/301.6 S

*Primary Examiner*—Jack Cooper
*Attorney, Agent, or Firm*—Wenderoth, Lind & Ponack

[57] ABSTRACT

Flake-like ceramic particles of zinc sulfide phosphor and method of preparing the same including the steps of preparing flake-like particles of basic zinc sulfate crystal doped with activator, sulfurizing in the particles carbon disulfide, and heating the sulfurized particles in hydrogen sulfide. Particularly by steeping said particles in a solution of alkaline earth metal salt prior to or after sulfurizing, grain growth in ceramic particles can be improved.

11 Claims, 1 Drawing Figure

METHOD OF PREPARING FLAKE-LIKE CERAMIC PARTICLE OF ZINC SULFIDE PHOSPHOR

BACKGROUND OF THE INVENTION

The present invention relates to zinc sulfide phosphor or luminescent material for use in electronic devices such as cathode ray tubes or the like and more particularly, to a material constituted by ceramic particles of zinc sulfide phosphor having flake-like shape or large particle diameter, and method of manufacture thereof.

Previously, it has been discovered by the present inventors that, when crystals of basic zinc sulfate are deposited by precipitation from a solution containing zinc sulfate and urea, the crystals take the flake-like shape as disclosed in U.S. patent application Ser. No. 864,447, now abandoned assigned to the same assignee as the present application. The present invention intends to provide ceramic particles of zinc sulfide phosphor having flake-like configuration or large particle diameter by using flake-like crystal particles of basic zinc sulfate obtained in the above described manner as raw material.

Conventionally, the luminescent screen of a cathode ray tube, for example, is constituted by application of phosphor particles of approximately spherical shape having particle diameter of 5 to 10 $\mu$m onto a substrate such as a front glass of the cathode ray tube to the thickness of 10 to several tens $\mu$m. Since the brightness or luminescence of a cathode ray tube largely depends on how the luminescent screen is formed, it becomes necessary to constitute the luminescent screen in such a manner that luminescence from the phosphor is taken out at the front of the luminescent screen as effectively as possible. For the above purpose, it is required to increase light transmittance of the fluorescent film through reduction of scattering and absorption of light within the fluorescent film, which is largely affected by the size and configuration of the phosphor particles. Especially, the configuration of the particles is very important, and when the light transmittance of the fluorescent film itself is improved by spreading the phosphor particles of flat flake-like shape onto the front glass, the luminescent efficiency of the luminescent screen is improved with a consequent high luminescence intensity. The present invention, when applied particularly to color, monochrome and projection type televisions, flat panel display, plasma display and the like, provides display equipment having a high display effect.

Known zinc sulfide phosphor material is prepared by adding activator to zinc sulfide sediments produced by passing hydrogen sulfide through an aqueous solution of zinc sulfate for subsequent calcination in hydrogen sulfide or together with flux. In the conventional method as described above, zinc sulfide obtained by the settling is in the form of fine powder with poor crystallization, and even after the subsequent calcination, the particle diameter thereof is only in the region of 5 to 10 $\mu$m at most. Moreover, it is difficult to control the particle shape into flake-like configuration, etc., and from the viewpoint of mass productivity, it is considered to be almost impossible to produce phosphor of flake-like shape or of large particle diameter by the conventional methods.

SUMMARY OF THE INVENTION

Accordingly, an essential object of the present invention is to provide an improved material constituted by ceramic particles of zinc sulfide phosphor having flake-like shape or large particle diameter, with substantial elimination of disadvantages inherent in the conventional zinc sulfide phosphor of the kind.

Another important object of the present invention is to provide a method of preparing an improved zinc sulfide phosphor material of the above described type which employs crystals of zinc salt having flake-like shape or large particle diameter as starting material for conversion thereof into sulfides with features in the configuration thereof being maintained.

A further object of the present invention is to provide a method of preparing an improved zinc sulfide phosphor material of the above described type on a large scale at low cost.

In accomplishing these and other objects, according to one preferred embodiment of the present invention, there is provided a method of preparing flake-like ceramic particles of zinc sulfide phosphor which includes the steps of preparing flake-like particles of basic zinc sulfate crystal doped with activator, sulfurizing said particles in a carbon disulfide atmosphere at a temperature from 400° to 800° C., and heating in a hydrogen sulfide atmosphere at a temperature from 800° to 1200° C. By the processing according to the present invention as described above, an improved zinc sulfide phosphor for use in crystal-oriented electronic devices has been advantageously presented, with disadvantages inherent in the conventional zinc sulfide phosphor being substantially eliminated.

BRIEF DESCRIPTION OF THE DRAWING

These and other objects and features of the present invention will become apparent from the following description taken in conjunction with the preferred embodiments thereof with reference to the accompanying drawing, in which, The FIGURE is a schematic diagram showing on an enlarged scale, the sintered structure of flake-like zinc sulfide phosphor obtained in EXAMPLES 8 to 11 according to the present invention.

DETAILED DESCRIPTION OF THE INVENTION

Figure 1:
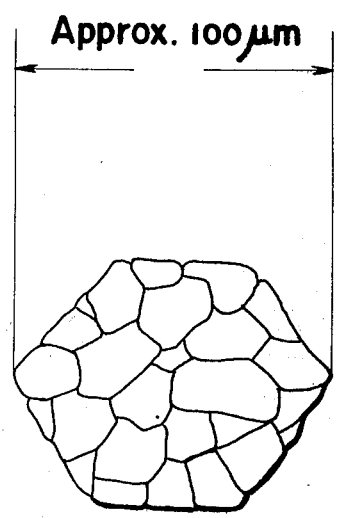

In the first place, it is to be noted that the present invention is based on the finding of a new method in which flake-like particles of basic zinc sulfate having configuration desirable for particles of the final phosphor material are employed as starting material instead of fine particles of zinc sulfide, so as to be converted into zinc sulfide phosphor through employment of a suitable method without largely altering the particle configuration.

More specifically, the method of producing an improved zinc sulfide phosphor material according to the present invention includes the steps of preparing crystals of basic zinc sulfate of flake-like shape and having large and thick particle size, converting said flake-like crystals of basic zinc sulfate into flake-like particles constituted by fine particles of zinc sulfide through sulfurizing treatment at a low temperature in an atmosphere of carbon disulfide, and causing the fine particles of zinc sulfide in said flake-like particles to grow in an atmosphere of hydrogen sulfide for conversion thereof into flake-like ceramic particles of light transmitting nature.

For preparing zinc sulfide through dry sulfurizing treatment without employment of a solution, with the configuration of the starting material being maintained as far as possible, it is preferable that the starting material is not only readily sulfurized, but has less movement of substance in the sulfurization, i.e., it has a composition as simple as possible or as close to zinc sulfide as possible.

For zinc compounds as described above, although zinc oxide, zinc hydroxide, zinc sulfate, and basic zinc sulfate may be considered, it has already been found by the present inventors that basic zinc sulfate is the most suitable for obtaining flake-like crystals of large diameter in a large quantity at low cost as disclosed in U.S. patent application Ser. No. 864,447 mentioned earlier, in which the large diameter flake-like crystals of basic zinc sulfate are readily available by gradually hydrolyzing urea in an aqueous solution of zinc sulfate.

More specifically, when an aqueous solution prepared by dissolving zinc sulfate in an amount of 0.1 to 6 mole per liter and urea at 0.1 to 6 mole ratio with respect to zinc sulfate, is gradually heated at the temperature range of 50° to 100° C., urea is hydrolyzed to deposit flake-like crystals of basic zinc sulfate in a large quantity. Instead of initially adding urea as described above, if an aqueous solution of urea is gradually added dropwise into the aqueous solution of zinc sulfate heated up to temperatures of 80° to 100° C., hexagonal flake-like crystals of basic zinc sulfate having large diameter and sufficient thickness can be obtained. For preparing the starting material for phosphor production, at least one metal selected from the group consisting of Cu, Ag, Au, Al, In, Ga, rare earth elements, Mn, etc. may be added, at $10^{-5}$ to $10^{-2}$ atomic ratio with respect to zinc, as activator to the aqueous solution of zinc sulfate and/or urea.

Of course, zinc sulfate oxide and zinc oxide available by further heating the flake-like crystals of basic zinc sulfate obtained in the above described manner may be used as the starting material.

The present invention is particularly characterized in that, by subjecting the flake-like crystals of zinc salts as described in the foregoing to heat treatment in a sulfurizing atmosphere, these crystals are converted into sulfides with the specific particle configuration thereof being maintained. For the sulfurizing atmosphere, carbon disulfide, hydrogen sulfide, sulfur vapor, etc. may be considered, among which carbon disulfide shows the strongest sulfurizing action, and particularly, in cases where oxygen is heavily detrimental to luminescence as in the zinc sulfide phosphor, heat-treatment in a carbon disulfide atmosphere is the most preferable. Although sulfurization is possible in an atmosphere of hydrogen sulfide, carbon disulfide makes it possible to sulfurize at a lower temperature. When the sulfurizing is effected in an enclosed system or system close thereto, compounds such as sulfur or those which generate sulfur vapor by heating may be enclosed together with zinc compounds.

The temperature for sulfurizing may be in the region from 400° to 800° C. in a carbon disulfide atmosphere, but should be slightly higher than the above at 700° to 1200° C. if an atmosphere of hydrogen sulfide was employed. In the sulfurizing at lower temperatures, the external flake-like configuration of the crystals is maintained with almost no alteration, but upon careful examination, sintered structure of zinc sulfide having particle diameter less than 1 μm is observed. For obtaining phosphor material with a high luminescence with addition of activator, it is necessary to carry out the calcination with hydrogen sulfide at temperatures higher than 700° C., and upon calcination at the temperature from 800° to 1200° C., phosphor material particularly high in luminescence can be obtained. It is to be noted, however, that zinc sulfide after the calcination shows different crystalline structures at a border line of approximately 1000° C. i.e. crystalline structure of α type at higher temperatures and that of β type at lower temperatures. In the calcination at temperatures higher than approximately 800° C., the flake-like particles of zinc sulfide grow from several μm to several tens μm in the particle diameter thereof so as to be coupled to each other in a plane to provide a flat sintered structure. Although it has been conventionally deemed difficult to produce a sintered structure of zinc sulfide, according to the present invention, it has been made possible to readily obtain the sintered structure of zinc sulfide via crystals of other zinc salts. The time required for the sulfurizing by carbon disulfide may be 5 to 6 hours, while a time of 1 to 2 hours sufficiently serves the purpose in the case of the calcining treatment by hydrogen sulfide.

The flake-like ceramic particles of zinc sulfide phosphor obtained in the manner as described in the foregoing have a particle diameter of approximately 30 to 200 μm and thickness of about 10 μm, and are constituted by fine crystalline particles of several μm in diameter, by which, however, light is undesirably scattered, and the light transmittance of the flake-like particles is not necessarily satisfactory. Especially in the presence of more than several crystalline particles directed in the direction of thickness of the flake-like configuration, the light transmittance is considerably lost due to scattering of light. Therefore, for the improvement of light transmittance, it is necessary to reduce the scattering of light by increasing the size of individual crystalline particles.

According to the experiments carried out by the present inventors under various calcining conditions for increasing light transmittance of the flake-like ceramic particles of the zinc sulfide phosphor produced in the above described manner, it has been found that, by causing alkaline earth metal salts to react in the process of the heat treatment, growth of the crystalline particles is promoted, and consequently, flake-like ceramic particles with a high light transmittance are available.

More specifically, the above process is effected by immersing the flake-like particles in an aqueous solution of alkaline earth metal salts after the sulfurizing by carbon disulfide. In other words, by causing alkaline earth metal salts to adhere to surfaces of the flake-like particles constituted by the very fine particles after the sulfurizing with carbon disulfide, high temperature treatment by hydrogen sulfide is effected. For the alkaline earth metal salts, various carbonates, sulfates, and halides may be employed, but chlorides of calcium, magnesium, barium and strontium are particularly effective for the growth of crystalline particles, with barium chloride showing the most remarkable effect. The concentration of alkaline earth metal salt in its aqueous solution may be from 0.001 to 2.0 moles per liter.

The flake-like ceramic particles of zinc sulfide phosphor obtained in the above described manner have a particle size of 30 to 200 μm and thickness of about 10

μm, and the crystalline particles therein have a particle size amounting to 10 to 50 μm, with an extremely high light transmittance.

As described in the foregoing, the present invention has, for the first time, succeeded in producing flake-like particles of zinc sulfide phosphor on a large scale at low cost through employment of the ceramic technique. Furthermore, although the zinc sulfide phophor synthesized through solid conversion from zinc compounds having an oxygen atom as part of the composition has conventionally been considered to be insufficient in the brightness of luminescence, the phosphor according to the present invention is free from reduction in luminescence, with sufficient brightness.

Hereinbelow, examples are inserted for the purpose of illustrating the present invention without any intention of limiting the scope thereof.

EXAMPLE 1

1 mole of zinc sulfate (highly pure reagent), 3 moles of urea (highly pure reagent), and $2.5 \times 10^{-5}$ moles each of aluminum sulfate and copper sulfate were dissolved into 1 liter of water, and gradually heated while being stirred so as to be allowed to stand for 3 hours at a temperature of 90° C., as a result of which whitish sediments were obtained. Upon separation of the sediments through filtration, with subsequent rinsing and drying at a temperature of 80° C., fine powder composed of basic zinc sulfate crystals of colorless and transparent hexagonal flake-like configuration amounting to several hundred μm in the maximum particle diameter was obtained. By subjecting said fine powder thus obtained to heat-treatment at a temperature of 500° C. for 5 hours in a vapor of carbon disulfide, zinc sulfide crystalline particles retaining the hexagonal flake-like shape were obtained. Upon subsequent heat-treatment of the crystalline particles at a temperature of 1050° C. for 2 hours in a hydrogen sulfide stream, ZnS: Cu, Al green luminescent phosphor of flake-like shape, in which zinc sulfide particles having diameter of 10 to several tens μm were coupled to each other and sintered, was obtained. When the phosphor thus obtained was applied by the settling method onto a glass substrate having an electrically conductive film, with subsequent projection thereto of electron beam at accelerated voltage of 20 KeV for measuring the luminescence through the glass substrate, brightness 1.5 times that available from known ZnS: Cu, Al phosphor synthesized by the conventional methods was obtained.

EXAMPLES 2 TO 7

In a similar manner as in EXAMPLE 1, phosphors were prepared, with materials, activators and sintering conditions being altered, and respectively applied onto electrically conductive glass substrates for comparison of luminescence with the same kind of phosphor synthesized by the conventional method, the results of which are tabulated in Table 1.

EXAMPLES 8 TO 11

1 mole of zinc sulfate (highly pure reagent), 3 moles of urea (highly pure reagent) and $10^{-4}$ moles each of aluminum sulfate and copper sulfate were dissolved into 1 liter of water, and gradually heated while being stirred so as to be allowed to stand for 3 hours at a temperature of 90° C., as a result of which whitish sediments were obtained. Upon separation of the sediments through filtration, with subsequent rinsing and drying at a temperature of 80° C., fine powder composed of basic zinc sulfate crystals of hexagonal flake-like configuration amounting to several hundred μm in the maximum particle diameter was obtained. The fine powder thus obtained was subjected to low temperature heat treatment at a temperature of 500° C. for 5 hours in carbon disulfide for conversion thereof into flake-like zinc sulfide, which is then immersed in an aqueous solution containing alkaline earth metal, with subsequent separation by filtration and drying. For the alkaline earth metal compounds, barium chloride, calcium chloride, magnesium chloride and strontium chloride were employed, with aqueous solution concentration of 0.05 mole/liter. The material to the surface of which alkaline earth metal adheres as described above was then subjected to high temperature heat treatment, which is sintering at a temperature of 1050° C. for 1 hour in the atmosphere of hydrogen sulfide. The flake-like zinc sulfide phosphor obtained in the above described manner had a sintered structure (one example thereof is shown in the FIGURE) in which zinc sulfide particles having the maximum particle diameter of 20 to 60 μm were coupled to each other in a plane, and the direction of thickness of the flake-like shape was occupied almost by one particle, with consequent increase of light transmittance. The phosphor thus obtained was applied by the settling method onto a glass substrate having an electrically conductive film to a film thickness of 40 μm, with subsequent projection thereto of electron beam at accelerated voltage of 20 KeV to measure the luminescence through the glass substrate for comparison with that of the phosphor screen employing the conventional phosphor of ZnS: Cu, Al having particle configuration close to spherical shape.

EXAMPLES 12 TO 15

For showing the effect of alkaline earth metal salts, with other conditions being maintained approximately equal to those in the foregoing EXAMPLES, comparison was made between the case where barium chloride was employed and the case where barium chloride was not employed, the results of which are shown in Table 1.

EXAMPLES 16 TO 20

Flake-like zinc sulfide phosphor was prepared in a similar manner to that in EXAMPLE 1, with the exception that concentrations of aqueous solution containing the alkaline earth metal, low temperature heat-treatment conditions, high temperature heat-treatment conditions and activators as parameters were altered.

The flake-like zinc sulfide phosphor thus obtained was used to form a phosphor screen in the same manner as in EXAMPLE 1 for measurement of brightness or luminescence, the results of which are also shown in Table 1. It is to be noted that in Table 1, the relative phosphor luminescence is represented by values for comparison with phosphor screens employing conventional phosphor of the same kind (i.e. zinc sulfide having spherical particle configuration according to conventional method).

EXAMPLES 21 TO 26

Comparison was made in the size of basic zinc sulfate particles between the "simultaneous" method for deposition of precipitate by heating a mixed aqueous solution of zinc sulfate and urea, and the "dropwise addition method" in which an aqueous solution of urea is added dropwise into the heated aqueous solution of zinc sulfate, to both of which aqueous solutions Cu and Al were added. As a result, as shown in Table 2, it was found that basic zinc sulfate particles deposited by the "dropwise addition method" had diameter thereof somewhat larger, with considerably large thickness several to 10 times that of the particles obtained by the "simultaneous method," and the above trend is particularly conspicuous in the deposition at high temperatures. As a result of thermal analysis and X-ray analysis, the crystals as described above were in the range $2.3 \leq X \leq 3.9$ when represented by the general formula $Zn\ SO_4 \cdot XZn(OH) \cdot YH_2O$, and mostly concentrated in the vicinity $X \approx 3$. Although the value of Y largely varies depending on the methods of drying after the analysis, it was normally in the neighborhood of $Y=4$. When the basic zinc sulfate was formed into zinc sulfide phosphor in the manner as in EXAMPLES 1 TO 20, phosphor characteristics similar thereto were obtained.

TABLE 1

| Example | Activator | CS$_2$ sulfurizing treatment (°C., hr.) | Alkaline earth metal aqueous solution mol/liter | H$_2$S heat treatment (°C., hr.) | Relative phosphor luminance | Light transmittance |
| --- | --- | --- | --- | --- | --- | --- |
| 1 | Cu, Al | 500° C., 5hr | — | 1050° 1050°2hr | 150 | Δ(good) |
| 2 | Cu, Al | 600° C., 5hr | — | 1100° C., 2hr | 135 | Δ |
| 3 | Cu, Al | 500° C., 5hr | — | 1000° C., 2hr | 130 | Δ |
| 4 | Cu | 600° C., 5hr | — | 1050° C., 2hr | 60 | Δ |
| 5 | Ag, Al | 500° C., 5hr | — | 900° C., 1.5hr | 150 | Δ |
| 6 | Ag, Cl | 400° C., 7hr | — | 950° C., 2hr | 130 | Δ |
| 7 | Au, Ag, Al | 700° C., 4hr | — | 1100° C., 1.5hr | 200 | Δ |
| 8 | Cu, Al | 500° C., 5hr | BaCl$_2$, 0.05 | 1050° C., 1hr | 165 | O(excellent) |
| 9 | Cu, Al | 500° C., 5hr | CaCl$_2$, 0.05 | 1050° C., 1hr | 160 | O |
| 10 | Cu, Al | 500° C., 5hr | MgCl$_2$, 0.05 | 1050° C., 1hr | 160 | O |
| 11 | Cu, Al | 500° C., 5hr | SrCl$_2$, 0.05 | 1050° C., 1hr | 155 | O |
| 12 | Ag, Al | 600° C., 5hr | — | 1050° C., 1hr | 140 | Δ |
| 13 | Ag, Al | 600° C., 5hr | BaCl$_2$, 0.1 | 1050° C., 1hr | 165 | O |
| 14 | Au, Ag, Al | 600° C., 5hr | — | 1050° C., 1hr | 160 | Δ |
| 15 | Au, Ag, Al | 600° C., 5hr | BaCl$_2$, 0.1 | 1050° C., 1hr | 200 | O |
| 16 | Cu, Al | 600° C., 5hr | BaCl$_2$, 0.003 | 1100° C., 1hr | 145 | O |
| 17 | Cu, Al | 600° C., 5hr | BaCl$_2$, 0.03 | 1100° C., 1hr | 165 | O |
| 18 | Cu, Al | 600° C., 5hr | BaCl$_2$, 0.3 | 1100° C., 1hr | 160 | O |
| 19 | Cu, Al | 600° C., 5hr | BaCl$_2$, 1.0 | 1100° C., 1hr | 140 | O |
| 20 | Ag, Al | 500° C., 10hr | BaCl$_2$, 0.1 | 1050° C., 1hr | 130 | O |

TABLE 2

| Example | Deposition method | ZnSo$_4$ mol/liter | : | Urea mol/liter | Deposition temperature °C. | Basic Zinc sulfate diameter | Thickness-diameter ratio |
| --- | --- | --- | --- | --- | --- | --- | --- |
| 21 | Simultaneous method | 1 | : | 3 | 80 | 15 | 1 : 15 |
| 22 | Dropwise addition method | 1 | : | 3 | 80 | 15 | 2 : 15 |
| 23 | Simultaneous method | 1 | : | 3 | 90 | 50 | 1 : 20 |
| 24 | Dropwise addition method | 1 | : | 3 | 90 | 70 | 1 : 7 |
| 25 | Simultaneous method | 1 | : | 3 | 100 | 120 | 1 : 100 |
| 26 | Dropwise addition method | 1 | : | 3 | 100 | 100 | 1 : 10 |

Although the present invention has been fully described by way of examples with reference to the accompanying drawing, it is to be noted that various changes and modifications are apparent to those skilled in the art. Therefore, unless otherwise such changes and modifications depart from the scope of the present invention, they should be construed as included therein.

What is claimed is:

1. A method of preparing flake-like ceramic particles of zinc sulfide phosphor, which comprises the steps of
preparing flake-like particles of basic zinc sulfate crystal doped with activator, by precipitating said basic zinc sulfate particles from an aqueous solution containing zinc sulfate, urea and an activator metal ion component which is at least one activator metal ion selected from the group consisting of copper, silver, gold, aluminum, indium, gallium, rare earth metal and manganese, the atomic ratio of said activator metal ion component in said aqueous solution being $10^{-5}$ to $10^{-2}$ with respect to the zinc atom of said zinc sulfate,
sulfurizing said basic zinc sulfate particles in a carbon disulfide atmosphere at a temperature from 400° to 800° C., and
heating the thus sulfurized particles in a hydrogen sulfide atmosphere at a temperature from 800° to 1200° C.

2. A method as claimed in claim 1, wherein said flake-like particles of basic zinc sulphate crystal doped with activator are prepared by
(a) preparing an aqueous solution of 0.1 to 6 mole per liter of zinc sulfate,
(b) heating said solution to a temperature from 80° to 100° C.,
(c) gradually adding an aqueous solution of urea to said zinc sulfate solution, the amount of urea being from 0.1 to 6 mole ratio with respect to said zinc sulfate, while stirring, whereby deposition of a precipitate of flake-like crystalline particles is caused, and
(d) separating said precipitate from the resultant mixture,
with the proviso that at least one of said zinc sulfate solution and said urea solution contains a metal ion component which is at least one metal ion selected from the group consisting of copper, silver, gold, aluminum, indium, gallium, rare earth metal and manganese, the atomic ratio of said metal ion component in said zinc sulfate solution and said urea solution combined being $10^{-5}$ to $10^{-2}$ with respect to the zinc atom of said zinc sulfate.

3. A method as claimed in claim 1, wherein said flake-like particles of basic zinc sulfate crystal doped with activator are prepared by
   (a) preparing an aqueous solution, of 0.1 to 6 mole per liter of zinc sulfate, 0.1 to 6 mole ratio of urea with respect to said zinc sulfate, and $10^{-5}$ to $10^{-2}$ atomic ratio of at least one metal ion selected from the group consisting of copper, silver, gold, aluminum, indium, gallium, rare earth metal and, manganese with respect to the zinc atom of said zinc sulfate,
   (b) heating said solution to a temperature from 50° to 100° C. while stirring, whereby deposition of a precipitate of flake-like crystalline particles is caused, and
   (c) separating said precipitate from said solution.

4. A method as claimed in claim 1, wherein said activator is a combination of copper and aluminum.

5. A method as claimed in claim 1, wherein said activator is a combination of silver and aluminum.

6. A method as claimed in claim 1, wherein said activator is a combination of silver, gold and aluminum.

7. A method of preparing flake-like ceramic particles of zinc sulfide phosphor, which comprises the steps of preparing flake-like particles of basic zinc sulfate crystal doped with activator, by precipitating said basic zinc sulfate particles from an aqueous solution containing zinc sulfate, urea and an activator metal ion component which is at least one activator metal ion selected from the group consisting of copper, silver, gold, aluminum, indium, gallium, rare earth metal and manganese, the atomic ratio of said activator metal ion component in said aqueous solution being $10^{-5}$ to $10^{-2}$ with respect to the zinc atom of said zinc sulfate, sulfurizing said basic zinc sulfate particles in a carbon disulfide atmosphere at a temperature from 400° to 800° C., steeping the thus sulfurized particles in an aqueous solution of 0.001 to 2.0 mole per liter of at least one alkaline earth metal salt selected from the group consisting of carbonates, sulfates and halides of calcium, magnesium, strontium and barium, filtering and drying the thus treated particles, and heating the dried particles in a hydrogen sulfide atmosphere at a temperature from 800° to 1200° C.

8. A method as claimed in claim 7, wherein said activator is a combination of copper and aluminum.

9. A method as claimed in claim 7, wherein said activator is a combination of silver and aluminum.

10. A method as claimed in claim 7, wherein said activator is a combination of silver, gold and aluminum.

11. A method as claimed in claim 7, wherein said alkaline earth metal salt is barium chloride.

* * * * *